United States Patent [19]
Cook et al.

[11] 3,816,078
[45] June 11, 1974

[54] TAPERING FLUIDIZED BED CHAMBER

[75] Inventors: Clayton C. Cook, Pittsburgh, Pa.; Roy M. Pope, Maryville, Tenn.

[73] Assignee: Aluminum Company of America, Pittsburgh, Pa.

[22] Filed: Sept. 14, 1971

[21] Appl. No.: 180,419

[52] U.S. Cl.............. 23/277 R, 23/284, 23/288 S, 34/57 A, 423/614, 432/58, 75/9
[51] Int. Cl............................................. B01j 9/18
[58] Field of Search............. 23/277 R, 284, 288 S; 34/57 R, 57 A, 10; 263/21 A; 75/9, 26; 423/610, 614

[56] References Cited
UNITED STATES PATENTS
2,630,309  3/1953  Ramsing ......................... 263/21 A
3,256,352  6/1966  Bohl et al. ..................... 23/288 S X
3,495,949  2/1970  Niedner ............................... 23/284

Primary Examiner—James H. Tayman, Jr.
Attorney, Agent, or Firm—Nims, Howes, Collison & Isner

[57] ABSTRACT

Fluidized bed chamber having a fluidized bed receiving portion therewithin intermediate the fluidizing gas distribution inlet means at the lower end thereof and the gaseous effluent outlet means at the upper end thereof, said receiving portion having a peripherally confining side wall lining slightly inwardly and upwardly tapering, e.g., in steps, in a direction from said inlet means toward said outlet means to minimize the occurrence of unfluidized material adjacent said lining.

2 Claims, 1 Drawing Figure

PATENTED JUN 11 1974 3,816,078
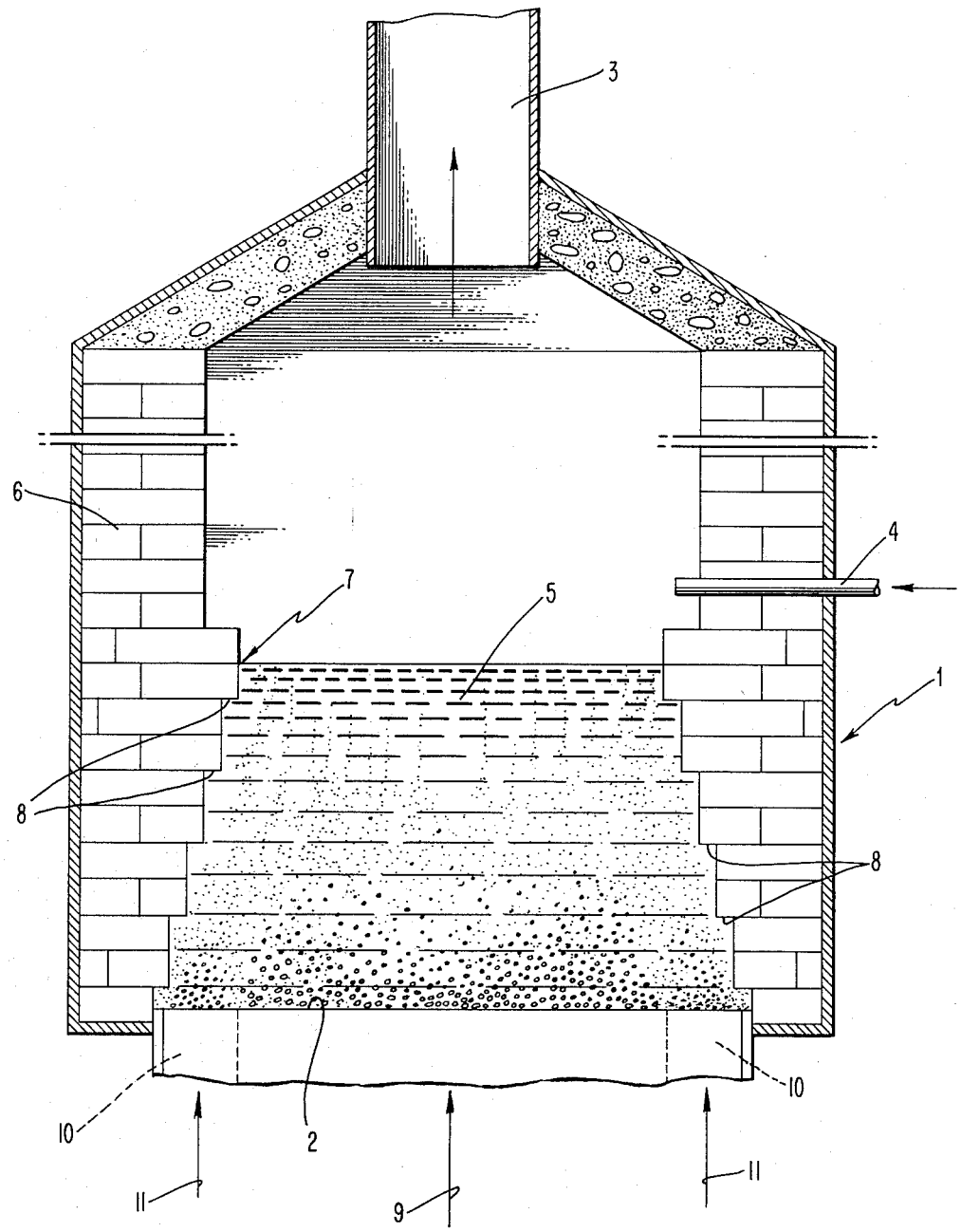
INVENTORS
CLAYTON C. COOK
ROY M. POPE
BY
ATTORNEY

TAPERING FLUIDIZED BED CHAMBER

The present invention relates to an improvement in fluidized bed chamber constructions, and more particularly to a fluidized bed chamber having an inwardly and upwardly tapering stepped perimetric side wall.

Fluidized bed chambers are widely used for carrying out physical manipulations and chemical reactions in a fluidized bed environment in which the bed particle material can either take part in the particular operation or serve as an inert medium or carrier. The fluidizing gas must be supplied in a quantity and at a flow rate sufficient, under the ambient conditions and in relation to the interior configuration and size of the chamber, to fluidize the selected size particles of the bed, yet prevent in the usual case entrainment of such particles in the gaseous effluent emanating from the top of the bed as well as channeling and/or agglomeration thereof and consequent bed failure. However, a persistently encountered and specifically unsolved problem has been the tendency of the peripherally outward portions of the bed to be insufficiently fluidized, whereupon insufficiently or even un-fluidized material progressively separates from the bed and accumulates or collects along the side wall of the chamber, especially adjacent the gas distribution inlet entrance.

This invention may be briefly described as an improved construction for fluidized bed chambers having its vertically disposed and peripheral bed confining side wall portions progressively inwardly tapering in the upward direction and, in its narrower aspects, having progressively inwardly stepped side walls to selectively disturb and disrupt the upward flow of fluidizing gas in the vicinity of such side walls.

The object of the invention is the provision of a fluidized bed chamber having an inwardly and upwardly tapering perimetric and bed confining side wall lining disposed between the gas distribution inlet means and gaseous effluent outlet means thereof.

Another object of the invention is the provision of such a chamber side wall lining which is stepped, and especially one which extends from a point adjacent the chamber inlet means inwardly and upwardly in a direction toward the chamber outlet means.

It is a further object of the invention to provide a construction of the foregoing type in which the tapered, stepped lining overhangs a peripheral fluidizing gas inlet so as to assure a selectively disturbed and disrupted flow of such gas adjacent the bed confining walls of the chamber.

Other and further objects of the invention will become apparent from a study of the within specification and accompanying drawings, in which:

The FIGURE of the drawing shows schematically, in vertical section, a fluidized bed chamber having an inwardly and upwardly tapering side wall lining constructed in accordance with the principles of this invention.

Referring to the drawing, there is provided a fluidized bed chamber 1 of the type having a conventional fluidizing gas distribution inlet means 2 — such as a perforated plate — at the lower end thereof, a gaseous effluent outlet means 3 at the upper end thereof, and a lateral bed particle material feed means 4 disposed above the fluidized bed therein and within which fluidized physical manipulations or chemical reactions are carried out. The chamber interior is lined with an appropriate impervious lining such as, by way of example, a brick lining 6, which may be suitably composed of refractory material or the like, especially where high temperature operations are to be carried out. The general size and configuration of the chamber 1 may be selected in accord with considerations of throughput and the nature of the operations to be carried out in the bed.

In accordance with the principles of this invention, the portion 7 of the chamber adapted to peripherally confine the fluidized bed 5 is contoured to provide a reverse taper, i.e., it is shaped to slightly inwardly and upwardly taper in a direction from the inlet means 2 toward the outlet means 3, and preferably provides a substantially frusto-conical configuration. Such tapered lining is preferably formed of progressively inwardly stepped bricks to provide a series of extending shoulders 8 as formed by the offset positioning of the bricks 6. Such side wall lining generally will only taper at a slight angle with respect to the vertical axis of the chamber 1, such as at an angle of between about 3° to 8°.

The tapered lining suitably extends from the lower portion of the chamber 1 adjacent the inlet means upwardly throughout the effective extent of the bed confining portion of the chamber and thus will terminate at a location more or less remote from outlet means 3. A bed 5 depth may be maintained so that the upper portion thereof extends slightly above the tapered portion 7.

In fact, in accord with a preferred feature of the instant construction, the described reverse tapered lining forms a complemental slightly restrictive throat for defining the overall path of travel of the entering gas, schematically shown by arrow 9, and for the fluidized bed 5, which operates to slightly constrict and compact the same. The gas stream 9 of course must conform to certain operative limitations necessary to maintain proper bed fluidization while avoiding channeling, agglomeration and failure.

Because of the slightly constricted nature of the tapered receiving portion 7, the upwardly flowing fluidizing gas stream is constricted to provide somewhat inwardly directed disruptively disturbed gas curtain tending to maintain the fluidized character of the bed. Moreover, the tapered wall leaves the particles at the periphery of the bed with no solid support, thereby creating a highly fluidized area adjacent the wall with resultant excellent solids-gas contact at the bed-wall interface.

As noted earlier, the effectiveness of the tapered lining or restricting throat construction of the invention for minimizing, if not preventing, the occurrence of un-fluidized particle material adjacent the lining is of un-fluidized particle material adjacent the lining is significantly assisted where the tapered lining is of stepped character. In this regard, the offset step surfaces form selective flow-disturbing or redirecting surfaces which effect the generation of eddy currents and/or turbulence at the outer perimeter of the upwardly directed gas flow where such flow impinges upon such surfaces.

Although it is not quite clear at this time, probably the bed particles execute a more or less composite toroidal flow pattern in which the main upward direction component is centrally located and the main downward direction component is radially outward therefrom, yet with due recognition of the fact that the fluidized bed phenomenon is characterized generally as covering a simulated or apparent boiling liquid form of bed. In any case, the tapered lining or restricting throat feature of the invention effectively minimizes or prevents bed particle loss along the outer confines of the bed.

The environmental configuration provided by the present construction for the bed defining walls of a fluidized bed chamber interior is particularly applicable for carrying out the chlorination of alumina-containing particles for producing aluminum chloride. By way of example, coked or carbon impregnated porous alumina particles, e.g., having a particle size of about 50–325 mesh, may be provided as bed particles fluidized by chlorine gas, such that the chlorine reacts with the coked alumina particles, preferably exothermically, to form a gaseous effluent containing aluminum chloride vapor and carbon oxides, from which the aluminum chloride can be recovered. Such operation is desirably conducted in the above described tapered chamber essentially without downward loss of alumina particles from the bed and/or accumulation or collection thereof adjacent the gas entrance, even though the bed particles are consumed by the chlorination to form gaseous reaction products.

It will be appreciated that the instant specification and drawing are set forth by way of illustration and not limitation, and that various modifications and changes may be made without departing from the spirit and scope of the present invention which is to be limited only by the scope of the appended claims.

What is claimed is:

1. In a fluidized bed chamber having fluidizing gas distribution inlet means disposed substantially coplanar with a particulate material supporting floor portion at the lower end thereof, gaseous effluent outlet means disposed at the upper end of said chamber remote from the floor portion thereof and fluidized bed material supply conduit means disposed intermediate the upper and lower ends of said chamber, the improvement comprising a peripherally confining side wall lining for such fluidized bed of progressively inwardly tapering stepped character formed of a plurality of surfaces disposed substantially perpendicular to the direction of fluidizing gas flow from said inlet means to said outlet means and selectively extending from adjacent abutting relation with said floor portion and gas inlet means upwardly toward and terminating in spaced relation with said outlet means to form a reaction zone for constrictively encompassing the fluidized bed material and fluidizing gas entering through said inlet means and to minimize the occurrence of unfluidized material adjacent said lining.

2. Improvement according to claim 1 wherein said lining tapers at an angle of about 3° to 8° with respect to the vertical axis of the chamber.

* * * * *